Patented Aug. 7, 1951

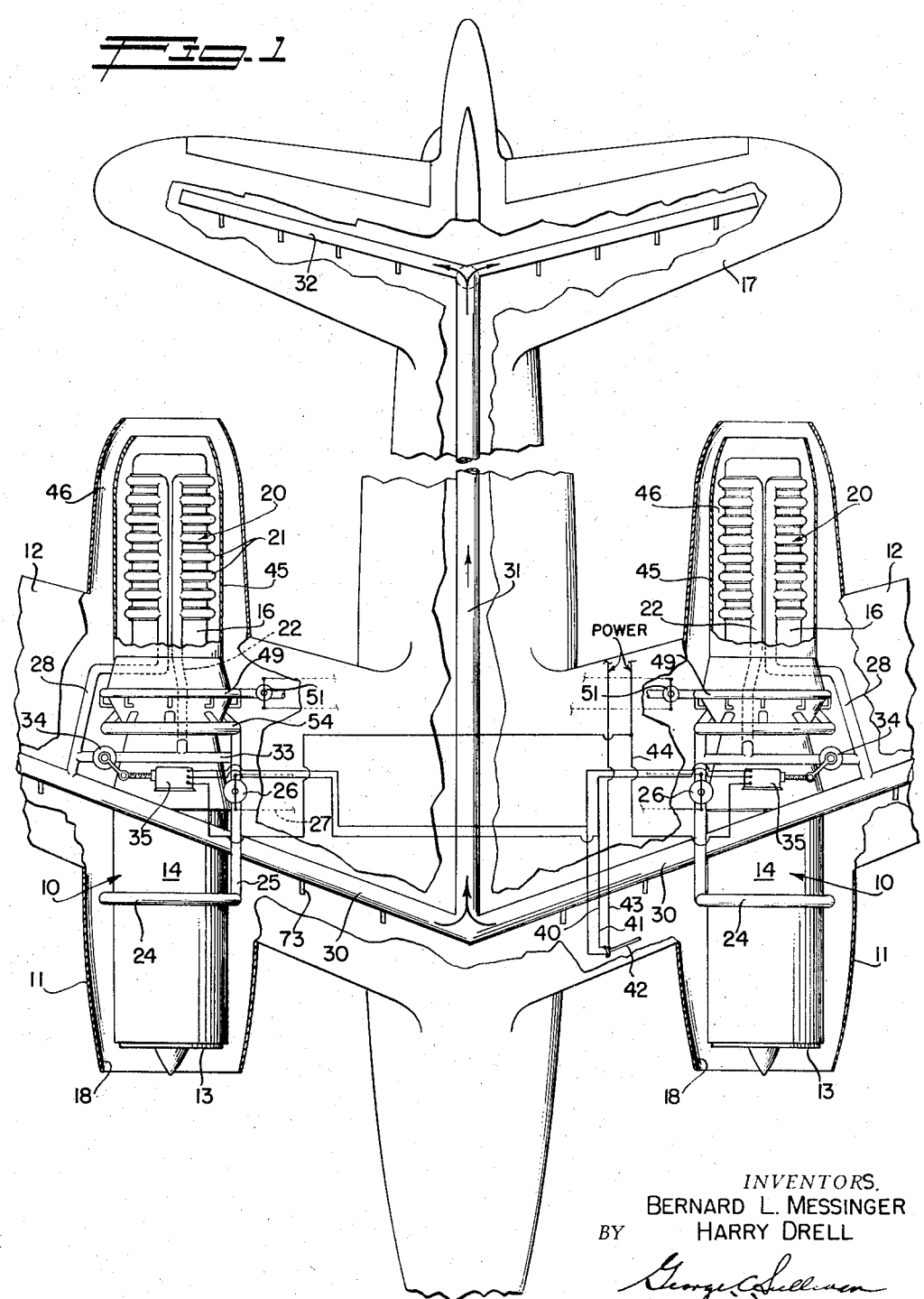

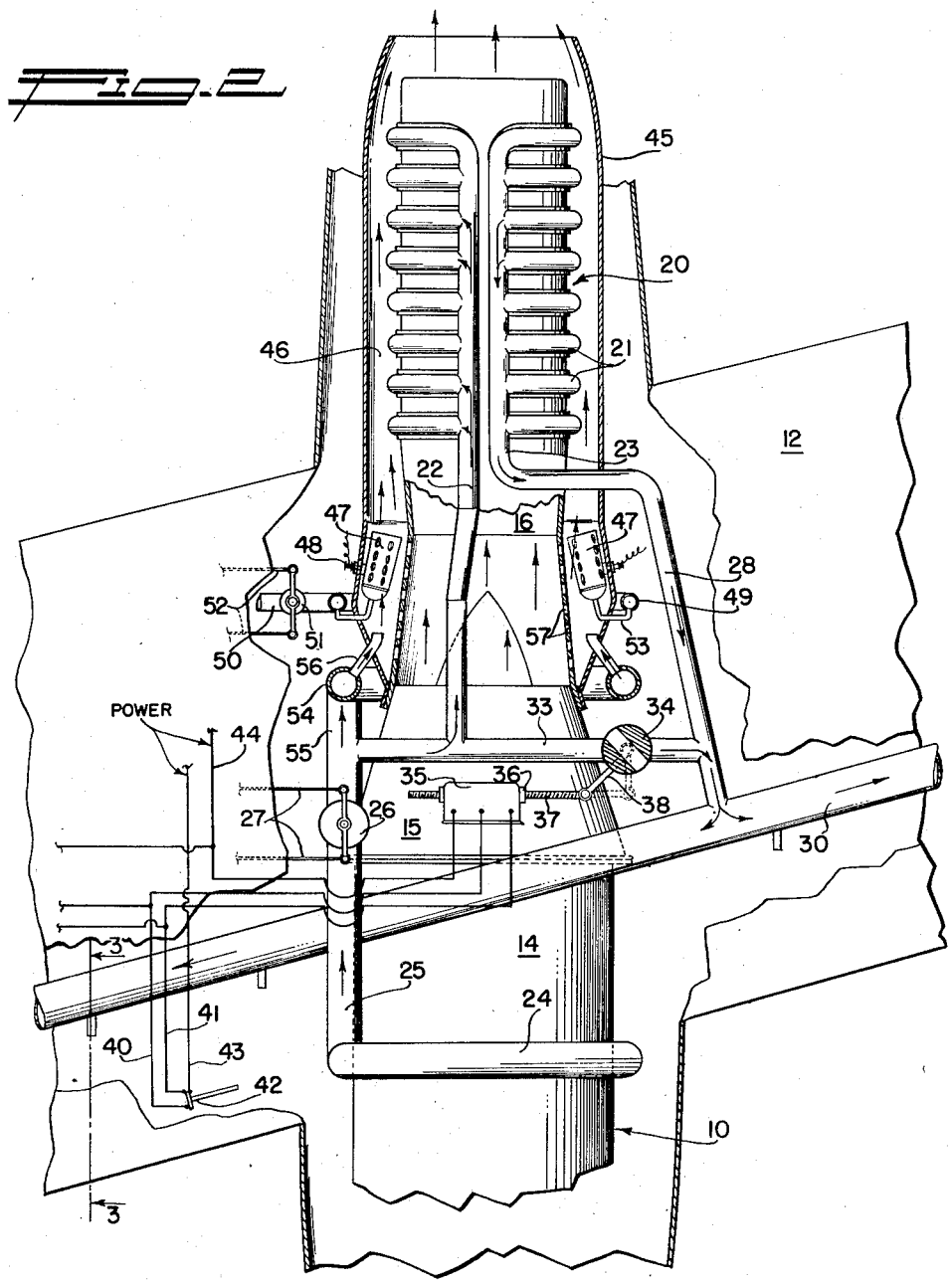

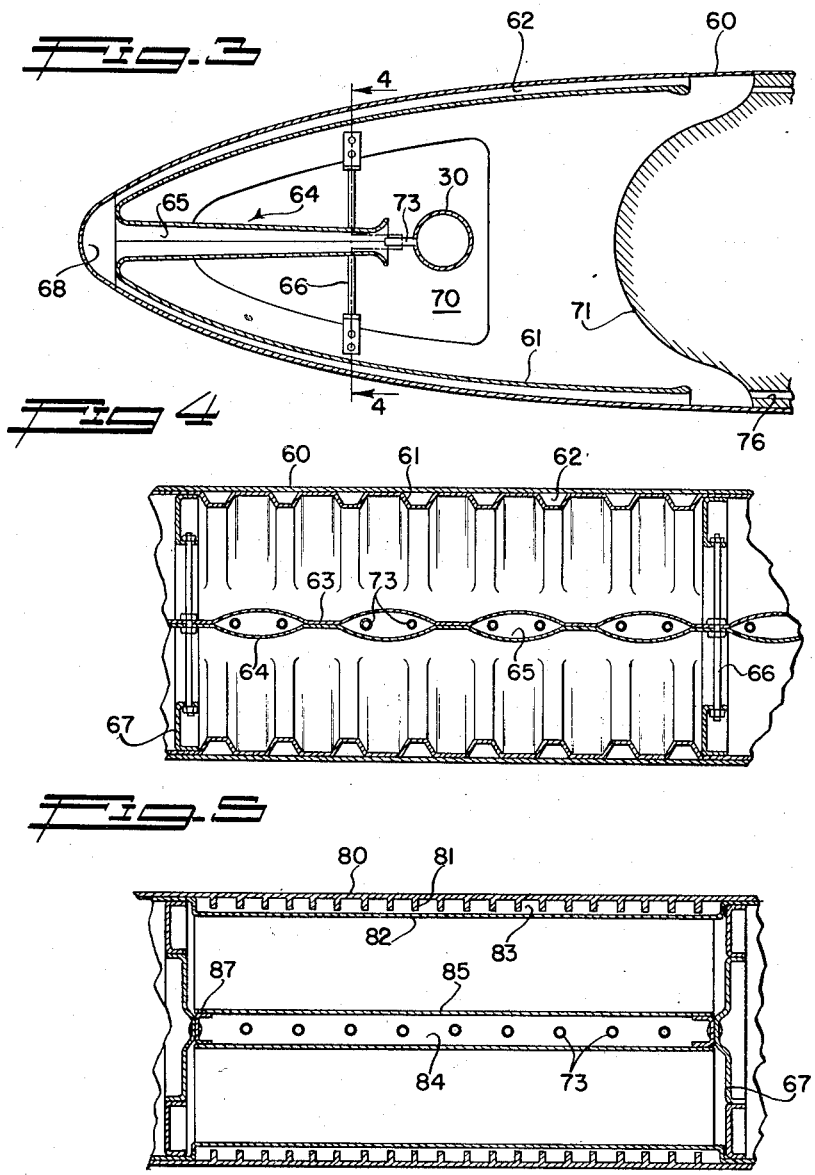

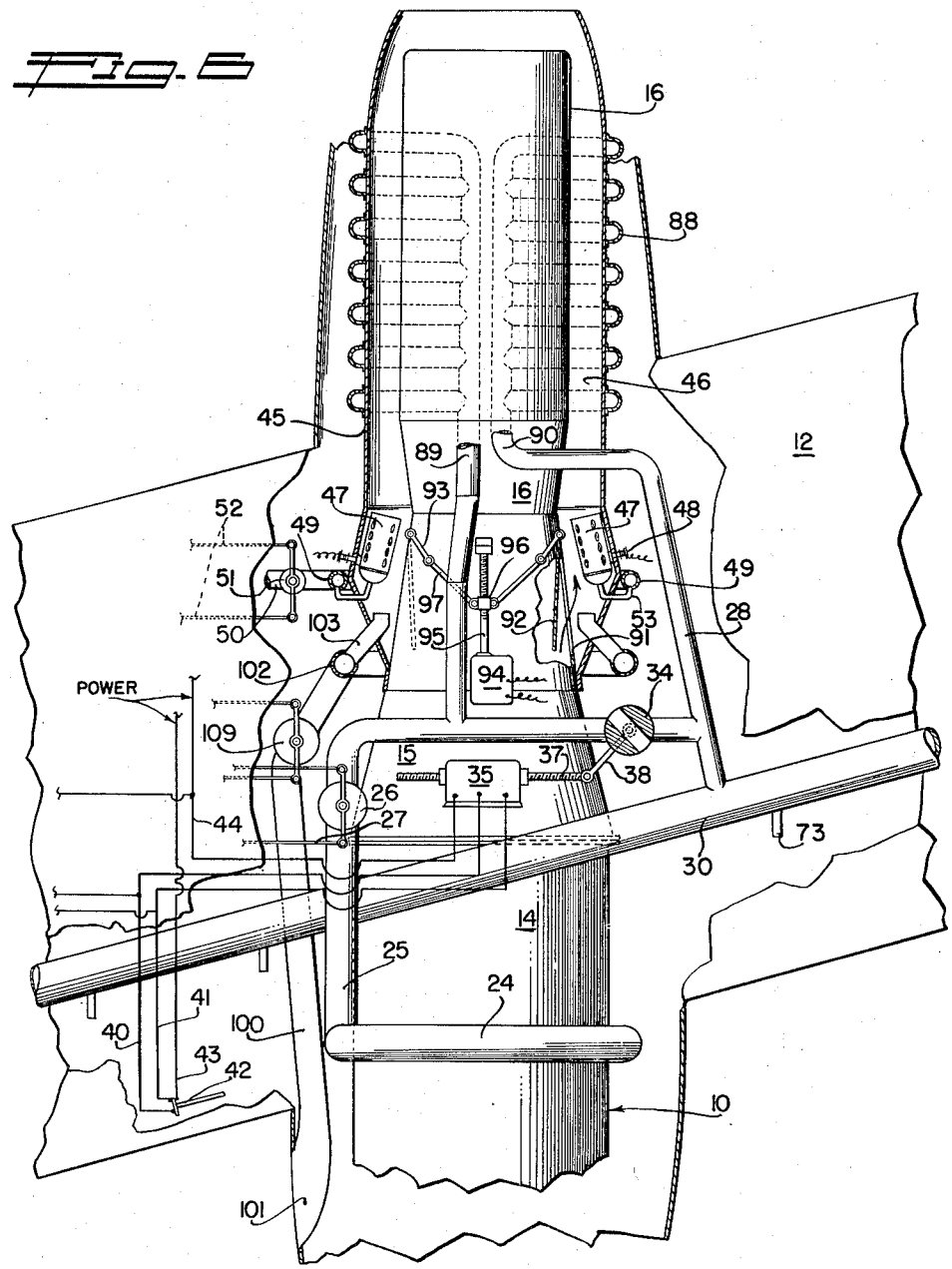

2,563,054

UNITED STATES PATENT OFFICE 2,563,054

THERMAL DEICING SYSTEM FOR AIRCRAFT

Bernard L. Messinger, Pacific Palisades, and Harry Drell, Sherman Oaks, Calif., assignors to Lockheed Aircraft Corporation, Burbank, Calif.

Application August 26, 1948, Serial No. 46,326

10 Claims. (Cl. 244—134)

This invention relates to means for preventing the formation and accumulation of ice on aircraft and relates more particularly to de-icing systems primarily suited for use in aircraft powered by turbo-powerplants.

Under certain weather and flight conditions, ice forms and accumulates on the wings, rudders, stabilizers, and other surfaces of the airplane, which not only overloads the craft but also adversely affects the aerodynamic characteristics. Various forms of de-icing systems and devices have been introduced for aircraft powered by reciprocating internal combustion engines. It has also been proposed to bleed compressed air from the compressors of turbo type aircraft engines and to employ this air as a heating or de-icing medium. While the air from such compressors is moderately hot, excessively large quantities of the air would have to be withdrawn from the powerplant where the de-icing demands are great. The bleeding off of such large quantities of the air would materially reduce the power output of the engines and, therefore, would be impractical.

It is an object of the present invention to provide a practical, efficient and economical de-icing system adapted for use in aircraft propelled by turbo or jet type powerplants.

Another object of the invention is to provide a de-icing system characterized by the employment of compressed air bled from the compressors of the propulsive engine or engines and heated in one or more heat exchangers associated with the engine tail pipes, the air to be utilized as the primary heating or de-icing fluid. In accordance with the invention, compressed air is bled from the compressors of the engines under the control of suitable valve means and this dense air is heated at the tail pipe areas of the engines prior to being directed to the wing surfaces, empennage surfaces, etc. to effect the thermal de-icing of the surfaces.

Another object of the invention is to provide a de-icing system of the character mentioned wherein the dense compressed heated air from the engine compressor or compressors is employed as a primary fluid or pumping fluid in an ejector system located in the leading edge regions of the aircraft surfaces. This primary heated fluid continuously heats and pumps or recirculates secondary air through passages extending chordwise of the surfaces to heat and de-ice the same. Thus the compressor air serves both to carry the heat to the chambers or passages in the leading edge areas and to pump and heat secondary air for de-icing the surfaces. With this manner of employing the compressed air a minimum volume of air is bled from the compressor and the efficiency or output of the propulsive engines is not materially affected.

Another object of the invention is to provide a de-icing system of the class referred to characterized by a safe, efficient and practical means for heating the compressor air prior to its delivery to the pumps or ejectors in the leading edge areas of the aircraft surfaces. The invention includes heaters or heat exchangers associated with the tail pipes of the turbo engines and the air bled from the compressors is passed through the heaters to absorb heat from the exhaust gases discharging through the tail pipes. Further, provision is made for the controlled burning of fuel in heater spaces around or within the heat exchangers so that the compressed air flowing therethrough is additionally heated by this supplemental or additional fuel burning. By associating the heaters or heat exchangers with the tail pipes of the engines, advantage is taken of the heat carried by the exhausting turbo gases and the de-icing heater fuel is safely and economically burned in the insulated tail pipe areas where the fire hazard is at a minimum. The combustion gases from the de-icer heaters are discharged together with the turbo exhaust gases at the nozzle of the tail pipe thus avoiding special or separate heater exhausts and conserving the energy in the compressed air bled from the compressors and the energy of the fuel consumed in the heater burners.

A further object of the invention is to provide a de-icing system of the character mentioned embodying an automatic thermostatically responsive control for regulating the compressed air flow through the heat exchangers in accordance with the demand or requirement.

Other objectives and features of the invention will become apparent from the following detailed description of typical preferred embodiments throughout which description reference will be made to the accompanying drawings, wherein:

Figure 1 is a fragmentary plan view of an airplane with certain portions broken away to illustrate parts of the de-icing system and two of the powerplants;

Figure 2 is an enlarged fragmentary plan view illustrating one of the powerplants and the associated de-icing system elements with certain parts broken away to appear in horizontal cross section;

Figure 3 is an enlarged fragmentary vertical sectional view of the leading edge portion of a wing, being a view taken substantially as indicated on line 3—3 on Figure 2 and illustrating the ejector means of the invention;

Figure 4 is a fragmentary vertical sectional view taken as indicated by line 4—4 on Figure 3;

Figure 5 is a view similar to Figure 4 illustrating a somewhat modified form of construction; and Figure 6 is a view similar to Figure 2 illustrating an alternative form of heat exchanger or heater.

In Figure 1 we have illustrated a portion of an airplane propelled by a plurality of turbo-jet type engines 10, housed in nacelles 11 spaced along the wings 12. In the present case it will be assumed that there are four or more engines 10, it being apparent that the system of the invention is adapted for use with aircraft having one, two or more engines. The invention is not primarily concerned with details of the powerplants and such details are omitted from the drawings. However, the engines 10 each have a ram inlet 13 at their forward ends, supplying rammed air to the compressors 14 and the engines include combustion chambers and turbines 15 which latter discharge the high temperature gases under pressure through tail pipes 16. The turbine exhaust gases discharges from the tail pipes 16 in the form of reactive propulsive jets in the well known manner.

The de-icing system of the invention may be designed and utilized to prevent the formation and accumulation of ice on the several surfaces of the airplane. In order to simplify the disclosure we have shown the system arranged to de-ice the leading edges of the wings 12 and horizontal stabilizers 17 of the empennage, it being apparent that the invention may be used to de-ice the various control surfaces, the ram inlets or air scoops 18 of the engines 10, etc.

The de-icing system as illustrated in Figures 1 and 2, includes heat exchangers 20 around the tail pipes 16 of the engines. While the heat exchangers 20 may be varied considerably in construction, the particular structure illustrated in the drawings is such that each heat exchanger includes a multiplicity of axially spaced substantially circular tubes 21 extending around the associated tail pipe 16. The tubes 21 extend slightly less than 360° and each tube has one end in communication with a compressed air supply manifold 22 and one end in communication with a discharge or outlet manifold 23. The pipes or manifolds 22 and 23 extend along the exterior of the tail pipes in adjacent parallel relation. While the tubes 21 may be simple tubes engaged or secured on the exteriors of the tail pipes 16, it is preferred to form them of strips of substantially U shaped transverse cross section and to arrange the strips with their open sides facing inwardly to be closed by the external surfaces of the tail pipes. The edges of the U shaped strips 21 are secured to and sealed with the tail pipes 16 as by welding. With this construction the air flowing through the tubes 21 is in direct heat transfer or heat absorbing relation to the surfaces of the tail pipes 16.

In accordance with the invention compressed air from the engine compressors 14 is supplied to the manifolds 22 for flow through the heat exchangers 20. Circular manifolds 24 extend around and have communication with the compressors 14 of the engines to receive compressed air therefrom. Air lines 25 under the control of valves 26 extend rearwardly from the manifolds 24 and the heat exchanger manifolds 22 communicate with the lines 25. The valves 26 may be operated or controlled in any appropriate manner, for example they may be manually operated by cables 27. The dense heated compressed air is conducted from the heat exchangers 20 by insulated pipes 28 to main header pipes or tubes 30, which extend through the wings 12 in spaced generally parallel relation to their leading edges. In the particular illustration illustrated, a similar tube 31 extends rearwardly from the tubes 30 through the fuselage of the airplane to the empennage where it delivers the air to lateral tubes 32 arranged in the horizontal stabilizer 17 in spaced relation to its leading edge.

It will be observed that with the arrangement just described the valves 26 associated with any given powerplant 10 may be closed in the event that powerplant fails or is shut down during flight and closing of the valve 26 prevents the loss of the heated compressed air from other powerplants.

A valve controlled by-pass means is associated with each engine installation so that the heating or de-icing effect may be varied as conditions require. By-pass tubes 33 extend between and connect the above described manifolds 22 and tubes 28 and are equipped with regulable valves 34. While the valves 34 may be manually controlled, if desired, we have illustrated thermostatically controlled operating systems for the valves. A reversible electric motor 35 is arranged adjacent each valve 34 and drives an internally arranged nut 36 which in turn meshes with and operates a jack screw 37. The jack screw 37 is pivotally connected with an operating crank 38 of the adjacent valve 34. The forward and reverse power leads 40 and 41 of the motors 35 extend to thermostatically operated switches 42 which are operable to selectively connect the leads with a power line 43. The other power lines 44 may extend directly to the reversible motors 35. The switches 42 are arranged to have their thermostatic or heat sensitive elements in temperature sensing relation to the leading edges or other parts to be protected against icing. With the system in operation and the valves 26 etc. open the switches 42 are operable to energize the motors 35 to move the valves 34 toward the closed positions so that the flow of compressed air through the heat exchangers 20 is reduced. If the temperature of the wing surfaces increases, the switches 42 control the motors 35 to open or partially open the valves 34 so that less air is directed through the heat exchangers 20. In this way the automatically controlled by-passes serve to regulate and limit the temperature of the compressed air supplied to the leading edge region in accordance with actual requirements.

Although the compressed air flowing through the heat exchanger 20 absorbs considerable heat from the turbine exhaust gases, it may be found necessary or desirable to further heat the compressed air. We provide effective heaters or burners in the region of the heat exchangers 20 to obtain the additional heating of the compressed air. The heater means include tubular shrouds 45 spaced around the tail pipes 16 and heat exchangers 20 to leave annular heater passages or chambers 46. The forward ends of the shrouds 45 may taper or converge inwardly to the tail pipes 16 or turbine casings. The shrouds 45 extend rearwardly beyond the ends of the tail pipes 16 and their rear portions are convergent. A plurality of liquid fuel burners 47 is provided in the forward portion of each burner passage 46. The burners 47 may be of any selected type and at least certain of the burners of each heater are provided with electrical fuel igniters 48. An annular fuel manifold 49 is provided around the forward portion of each shroud 45 and is supplied with liquid fuel by supply pipes 50. Valves 51 are interposed in the fuel lines 50 and may be manually controlled by cables 52. Branches 53 conduct fuel from the manifolds 49 to the burners 47. In order to provide ample oxygen or air for the combustion of the burner fuel in the passages or burner chambers 46, manifolds 54 receive compressed air from branches of the compressed air ducts 25 and have spaced pipes 56 discharging into the forward end of the chambers 46 in relation to the burners 47. It will be seen that when the valves 26 are opened, compressed air is supplied to the burner chambers 46 at circumferentially spaced points.

In order to supply additional air to the chambers 46 and to insure a limited flow of hot gases through the chambers to heat the compressed air in the heat exchanger 20 when the burners 47 are not in operation, a plurality of spaced perforations 57 may be formed in the walls of the forward portions of the tail pipes 16. The exhaust gases from the turbines 15 leave the turbines under substantial pressure and at a high temperature. Relatively minor portions of the hot gas streams flow through the perforations 57 into the heater chambers 46 and the gases thus admitted to the burner chambers give up a portion of their heat to the compressed air in the heat exchanger 20. With the burners 47 in operation substantial flames are propagated in the chambers 46 and the temperature of the compressed air flowing through the heat exchangers is materially increased. Thus it will be seen that dense compressed air heated to a substantial temperature is supplied to the pipes 23 of the several engine installations for distribution to the ducts 30, 31 and 32.

As above described, the ducts 30 and 32 are spaced rearwardly from and are substantially parallel with the leading edges of their respective surfaces. Because the air supplied to them is compressed and dense, and is also at a high temperature, the ducts 30, 31 and 32, which are preferably thermally insulated, may be relatively small in diameter. The high density, high temperature air also makes it feasible to employ efficient recirculating type de-icing heat transfer devices within the aerodynamic surfaces, etc. of the craft. Figures 3 and 4 illustrate one form of preferred arrangement for utilizing the high density, high pressure air for de-icing a wing. In these figures, which depict a portion of the leading edge of the wing 12, the skin 60 of the wing is internally supported or braced by a corrugated inner skin 61. The inner skin 61 conforms closely with the internal surface of the outer skin 60 and its undulations or corrugations are such as to leave a plurality of spaced air passages 62. The inner skin 61 is preferably made up of upper and lower assemblies or sections and the forward ends of the upper and lower sections are bent or turned rearwardly to have generally horizontal flanges or webs 64. These webs 64 extend rearwardly some distance but their rear ends lie in a plane a considerable distance forwardly of the rear edges of the inner skin 61. The webs 64 are corrugated or undulated to have spaced flat lands 63 which engage one another and which may be secured together by welding, riveting, or the like. Between the engaging lands 63 the undulations of the webs 64 are spaced apart to leave passages which we will term mixing tubes 65. Bolts 66, or the like, may secure the webs 64 to the ribs 67 or other internal structural elements of the wings. The forward ends of the inner skin assembly are spaced from the outer skin 60 leaving a distribution space 68 in the forward extremity of the wing assembly. The above described air passages 62 and the mixing tubes 65 communicate with this span-wise extending space 68.

The interior of the wing 12 and its leading edge region is clear and unoccupied except for the inner skin assembly, the duct 30, the ribs 67, etc. and the space within and rearward of the inner skin is in the nature of a plenum chamber 70. The rear of this chamber 70 may be closed by a wall 71, a fuel tank, a bulkhead, or the like. The above mentioned mixing chambers 65 are somewhat venturi shaped, having short flared or divergent rear end portions and having forwardly flared or divergent major portions. This configuration is clearly illustrated in Figure 3. The rear ends of the mixing chambers 64 are open to the plenum chamber 70 while the forward ends of the chambers discharge into the continuous distribution space 68. The duct 30 carrying the high density, high temperature air, extends through the plenum chamber 70 and is in spaced adjacent relation to the rear ends of the webs 64. Longitudinally spaced restricted nozzles 73 project forwardly from the duct 30 and are coaxial with the mixing chambers 65. The nozzles 73 discharge the high density, high temperature air forwardly into the rear ends of the mixing tubes 65 to induce or draw air forwardly from the plenum chamber 70 into the mixing tubes. Thus the primary air from the duct 30 serves to pump secondary air through the tubes 65 from the plenum chamber. The mixed air passes into the distribution space 68 and then rearwardly through the passages 62 to discharge into the plenum chamber. It will be seen that so long as the high temperature, high pressure air discharges from the nozzles 73 there is a continuous pumping of warm air from the plenum chamber 70 through the mixing tubes 65 and passages 62 to be mixed with and heated by the air from the nozzles and to give up a portion of the heat thus obtained in heating the outer skin 60 to prevent the formation and/or accumulation of ice. One, two or more nozzles 73 may discharge into each mixing tube 65 depending upon the size of the tubes, etc. In order to provide for the continuous discharge of air from the plenum chamber 70, we provide spaced bleed ports 76 which may empty the air overboard.

In Figure 5 we have illustrated another preferred manner of utilizing the high density, high temperature air for the de-icing of aircraft surfaces. In this case the outer skin 80 is integrally stiffened or reinforced by internal chordwise extending ridges or fins 81, machined or otherwise formed on the internal surface of the skin. The duct 30, the nozzles 73, the bleed ports 76, and the ribs 67, may be substantially the same as described above. However, the inner skin 82 in this case need not be corrugated but may be plain surfaced parts or sheets lying against or adjacent the ribs or fins 81 so that the spaces between the flanges or ribs form air passages 83 corresponding in position and function to the passages 62. The forward portions of the skin sections are turned rearwardly to define a mixing chamber 84, Here again the webs 85 defining the mixing chamber need not be corrugated but may be plain so that there is a continuous mixing chamber 84. The chamber 84 is of the same transverse configuration as the chambers 65, being open at its rear end to the plenum chamber 70 and being open at its forward end to the distribution space 68. The ends of the webs 85 are secured to the structural ribs 67 by suitable flange connections 87. The operation of the arrangement shown in Figure 5 is substantially the same as that of Figures 3 and 4.

Figure 6 illustrates another embodiment of heat exchanger and heater combination of the invention. In this case the heat exchanger is carried by and surrounds the shroud 45 and comprises a series of spaced tubes 88 of the same character as the above described tubes 21 engaged on and secured to the shroud. The manifolds 89 and 90 of the heat exchanger, corresponding to the above described manifolds 22 and 23, communicate with the compressed air supply ducts 25 and the ducts 28 respectively, as in the previously described form of the invention. The burners 47 are arranged in the forward portions of the passages 46 and are supplied with fuel by the pipe 50 under the control of the valve 51, all as above described. In the construction of Figure 6, ports 91 are provided in the forward portion of the tail pipes 16 in order to admit portions of the turbine exhaust gas streams into the passages 46. Valves 92 serve to control the ports 91. The valves 92 are of the hinge type and have operating cranks 93. The means for operating the valves 92 include reversible electric motors 94 which operate jack screws 95. Traveling nuts 96 are arranged on the screws 95 and links 97 operatively connect the nuts and the valve cranks 93. Upon operation of the motors 94 in one direction the valves 92 are closed and upon operation of the motors in the reverse direction the valves 92 are open. When it becomes necessary to operate the de-icing system the gas admitting valves 92 are open and the valves 51 and 54 are opened. The turbine exhaust gases contain ample air or oxygen to support the combustion of the fuel at the burners 47 so that the compressed air flowing through the heat exchangers is heated by the flame propagated at the burners 47 as well as by the turbine exhaust gases. The gases of combustion from the passages 46 discharge from the shrouds 45 together with the turbine exhaust gases to augment the reactive propulsive jets.

As an alternative to or in addition to the introduction of combustion oxygen for the burners 47 we provide means for delivering rammed air to the passage 46. This means may include a duct 100 leading from a scoop or inlet 101 to an annular manifold 102 and spaced nozzles 103 extend from the manifold to discharge the air into the forward end of the passage 46. The duct 100 is controlled by a valve 104. When full thrust is required or when the engine output is low, the valves 92 may be closed and the valve 104 opened to supply rammed air to the passage 46. In other situations where a substantial quantity of fuel is being consumed at the burners 47 the valves 92 as well as the valves 102 may be opened to supply adequate oxygen for the combustion of the fuel.

From the foregoing detailed description it will be seen that we have provided a simple, effective de-icing system by means of which a relatively small amount of compressed air, bled from the compressor of the powerplant, is efficiently utilized to de-ice the surface of the aircraft.

While the compressed air leaves the compressors of the powerplants at a relatively high temperature, an excessive quantity of this air would be required to de-ice the surfaces of large aircraft. However, with the system of the present invention the compressed air is heated further at the heat exchangers 20 and this super-heated compressed air is employed as a primary fluid in the pumping system provided in the leading edge regions of the surfaces. The primary pumping air serves to continuously recirculate the air within the leading edge region of the surfaces thus bringing an adequate volume of heated air into contact with the skin of the craft. Accordingly, the de-icing system of the invention makes it possible to utilize a relatively small portion of the compressed air from the compressors of the powerplants to obtain adequate de-icing and makes it unnecessary to bleed off large quantities of compressed air which would materially reduce the power output of the powerplants. Furthermore, by employing the high density, high temperature air in relatively small volumes, it is possible to employ small diametered light-weight ducts for distributing the primary air to the leading edge region of the surfaces with a minimum heat loss or temperature drop.

Having described only typical forms of the invention we do not wish to be limited to the specific details herein set forth, but wish to reserve to ourselves any variations or modifications that may appear to those skilled in the art and fall within the scope of the following claims.

We claim:

1. In an aircraft de-icing system the combination of; an outer skin subject to icing, duct means for conveying heated compressed air to the region of the outer skin, an internal skin structure within the outer skin and together with the outer skin defining a plurality of passages, there being a chamber within said structure, mixing tubes each having one end in communication with the chamber and one end in communication with said passages, nozzles for jetting streams of the heated compressed air from the duct means into the first named ends of the mixing tubes to induce air therein from the chamber so that air is continuously circulated from the chamber through the mixing tubes and passages and back to the chamber, and means for continuously bleeding air from the chamber.

2. In a de-icing system for use in an aircraft the combination of; an outer skin subject to icing, duct means for conveying heated compressed air to the region of the outer skin, an internal skin structure within the outer skin and together with the outer skin defining a plurality of passages, there being a chamber within said structure, venturi shaped mixing tubes carried by the inner skin each having an inlet end communicating with the chamber and an outlet end communicating with said passages, and nozzles on the duct means for discharging the heated compressed air into the inlet ends of the tubes to induce air thereinto from the chamber and to cause said air and the heated compressed air to circulate through said passages back into said chamber.

3. In an aircraft the combination of; an outer skin subject to icing, a plurality of spaced stiffening ribs projecting from the internal surface of the outer skin, duct means for carrying heated compressed air to the region of the outer skin, an inner skin structure arranged substantially parallel with the outer skin and together with the outer skin and its ribs defining a plurality of passages, there being a chamber within the assembly of the skins, mixing tubes each having an inlet end in communication with the chamber and an outlet end communicating with said passages, and nozzles on the duct means for jetting streams of heated compressed air into the inlet ends of said tubes to induce air thereinto from said chamber and to cause the mixed air from the chamber and the compressed heated air to circulate through said passages back to the chamber.

4. In a de-icing system for use in an aircraft the combination of: an outer skin subject to icing conditions, duct means for conveying heated compressed air to the region of the outer skin, an inner corrugated skin on the interior of the outer skin which together with the outer skin defines a plurality of passages, there being a chamber within the assembly of said skins, and ejector pump means for circulating air from said chamber through said passages including mixing tubes each having one end in communication with said passages and one end in communication with said chamber, and nozzles jetting the heated compressed air from the duct means into the first named ends of said mixing tubes.

5. In a de-icing system for use in an aircraft the combination of; an outer skin subject to icing, duct means for carrying heated compressed air to the region of the outer skin, spaced fins on the interior of the outer skin, an inner skin which together with the fins and outer skin define a plurality of passages, there being a chamber within the assembly of said skins, mixing tubes each having a first end in communication with said chamber and a second end in communication with said passages, and nozzles discharging the heated compressed air from said duct means into the first ends of said tubes to induce air from said chamber into the tubes for circulation through said passages.

6. In an aircraft de-icing system; the combination of an outer skin subject to icing conditions, duct means for carrying heated compressed air, a plenum chamber, mixing tube means communicating at one end with the plenum chamber, an internal skin structure spaced within the outer skin and therewith defining a plurality of air passages, said air passages each having one end in communication with the other end of said mixing tube means and each having its other end discharging into the plenum chamber, nozzle means for jetting the heated compressed air from the duct means into the first mentioned end of the mixing tube means to induce air from said chamber into said tube means and to cause a circulation of air from said tube means through said passages and thence to said chamber, and a bleed for said chamber.

7. In an aircraft de-icing system; the combination of an outer skin subject to icing conditions, duct means for carrying heated compressed air, a plenum chamber, an induction passage having one end in communication with the plenum chamber, internal skin structure related to the outer skin to therewith define air passages, the air passages each having one end in air receiving communication with the other end of the induction passage and each having its other end in discharging communication with the plenum chamber, and nozzle means for discharging the heated compressed air from the duct means into the first mentioned end of the induction passage to induce air from said chamber into the induction passage and to cause a circulation of air from said induction passage into said air passages and thence into said chamber, said chamber having at least one air bleed outlet.

8. In an aircraft; the combination of an outer skin subject to icing conditions, duct means for conveying heated compressed air, an internal skin structure within the outer skin and therewith defining a plurality of air passages, there being a chamber within said structure, and ejector pumping means jetting the heated compressed air from said duct means to circulate air from said chamber through said passages and back to the chamber.

9. In an aircraft; the combination of an integrally stiffened skin subject to icing and having spaced apart ridges on its internal surface, and a system for de-icing the skin including an internal structure lying close to said ridges to therewith define a plurality of air passages, and said structure having a mixing tube portion having one end is communication with corresponding ends of said passages, there being a plenum chamber within the assembly of said skin and internal structure which chamber communicates with the other end of said tube portion and the other ends of said air passages, a duct for carrying heated compressed air, nozzle means for discharging jets of the heated air from the duct means into said other end of the tube portion to induce air from said chamber into the tube portion and to cause a flow of heated air through the tube portion and said air passages back to said chamber, and means for bleeding air from said chamber.

10. In an aircraft; the combination of an outer skin, a corrugated inner skin lying against the inner surface of the outer skin to reinforce the same and to therewith define a plurality of air passages, there being a plenum chamber within the assembly of said skins having communication with one end of each of said passages, and a system for de-icing the outer skin comprising at least one mixing tube having a first end in communication with said chamber and a second end in communication with the other ends of said passages, a duct for carrying heated compressed air, nozzle means for jetting the heated compressed air into said first end of the tube to induce air from said chamber into said tube and to cause a flow of air through the tube and passages back into said chamber, and an air bleed for said chamber.

BERNARD L. MESSINGER.
HARRY DRELL.

REFERENCES CITED

The following references are of record in the file of this patent:

UNITED STATES PATENTS

| Number | Country | Date |
|---|---|---|
| 2,046,521 | Mahaffey | July 7, 1936 |
| 2,162,956 | Lysholm | June 20, 1939 |
| 2,264,297 | Clay | Dec. 2, 1941 |
| 2,447,095 | Schmidt | Aug. 17, 1948 |